United States Patent
Wang et al.

(10) Patent No.: US 11,081,686 B2
(45) Date of Patent: Aug. 3, 2021

(54) METAL OXIDE AND METHOD FOR PREPARING THE SAME

(71) Applicant: NINGDE AMPEREX TECHNOLOGY LIMITED, Ningde (CN)

(72) Inventors: Meng Wang, Ningde (CN); Leimin Xu, Ningde (CN); Liang Wang, Ningde (CN); Pengwei Chen, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 120 days.

(21) Appl. No.: 16/217,416

(22) Filed: Dec. 12, 2018

(65) Prior Publication Data

US 2020/0035991 A1 Jan. 30, 2020

(30) Foreign Application Priority Data

Jul. 26, 2018 (CN) .......................... 201810833439.0

(51) Int. Cl.
*H01M 4/131* (2010.01)
*H01M 4/1391* (2010.01)
(Continued)

(52) U.S. Cl.
CPC ......... *H01M 4/131* (2013.01); *H01M 4/1391* (2013.01); *H01M 4/485* (2013.01); *H01M 10/0525* (2013.01); *H01M 2004/028* (2013.01)

(58) Field of Classification Search
CPC . H01M 4/02–1391; H01M 10/05–525; H01M 4/131; H01M 4/485; H01M 4/525
(Continued)

(56) References Cited

FOREIGN PATENT DOCUMENTS

| CN | 1289738 A | 4/2001 |
|---|---|---|
| CN | 101200308 A | 6/2008 |

(Continued)

OTHER PUBLICATIONS

EPO machine translation of WO 2018095052 originally published to Li Yangxing on May 31, 2018 (Year: 2018).*

(Continued)

*Primary Examiner* — Cynthia H Kelly
*Assistant Examiner* — Niara Trant
(74) *Attorney, Agent, or Firm* — Juan Carlos A. Marquez; Marquez IP Law Office, PLLC (57) ABSTRACT

This application relates to a metal oxide and a method for preparing the same. Specifically, $Co_3O_4$ is selected as a precursor of lithium cobalt oxide, and one or more metal elements M are doped in the particles of $Co_3O_4$ to obtain a doped lithium cobalt oxide precursor $Co_{3-x}M_xO_4$, where $0<x\leq 0.3$. The difference value, measured by a spectrometer of a scanning electron microscope, of the weight percentage of one of M in two identical area regions is E, wherein $0<E\leq 1\%$ (wt. %). A lithium ion battery with lithium cobalt oxide prepared from the precursor as a cathode material shows great cycle stability, high-temperature energy storage performance and safety performance in a high-voltage (equal to or greater than 4.45 V) charging and discharging environment.

19 Claims, 4 Drawing Sheets

(51) Int. Cl.
  *H01M 4/485*    (2010.01)
  *H01M 10/0525*  (2010.01)
  *H01M 4/02*     (2006.01)

(58) Field of Classification Search
  USPC .......................................................... 429/231
  See application file for complete search history.

(56) References Cited

FOREIGN PATENT DOCUMENTS

| | | |
|---|---|---|
| CN | 103825021 A | 5/2014 |
| CN | 105047906 A | 11/2015 |
| CN | 105406036 A | 3/2016 |
| CN | 108123109 A | 6/2018 |
| CN | 108123114 A | 6/2018 |
| WO | 2018095052 A1 | 5/2018 |
| WO | WO-2018095052 A1 * | 5/2018 .............. H01M 4/48 |

OTHER PUBLICATIONS

Extended European Search Report, dated Dec. 11, 2019, in corresponding European application 19 178 077.4, 8 pages.
"Structural, optical, and magnetic properties of Mn and Fe-doped $Co_3O_4$ nanoparticles," Stella et al., AIP Advances, American Institute of Physics, vol. 5, No. 8, Aug. 2015.
Chinese First Office Action dated Mar. 31, 2020 in counterpart Chinese application 201810833439.0, 7 pages.

* cited by examiner

METAL OXIDE AND METHOD FOR PREPARING THE SAME

CROSS REFERENCE TO RELATED APPLICATIONS

The present application claims the benefit of priority from the China Patent Application No. 201810833439.0, filed on 26 Jul. 2018, the disclosure of which is hereby incorporated by reference in its entirety.

BACKGROUND

1. Technical Field

This application relates to a metal oxide and a method for preparing the same, and also relates to the application of the metal oxide as a precursor for synthesis of lithium cobalt oxide cathode materials and preparation of lithium ion batteries using the lithium cobalt oxide cathode materials.

2. Description of the Related Art

With the popularity of electronic products such as notebook computers, mobile phones, handheld game players and tablet computers, people have higher demands on batteries. Out of many batteries, compared with lead-acid batteries, nickel-cadmium batteries, nickel-hydrogen batteries and the like, lithium ion batteries have the advantages of large energy storage density, large power density, good safety, environmental friendliness, a long life, a low self-discharging rate, a wide temperature adaptation range and the like. Of the many cathode materials for lithium ion batteries, lithium cobalt oxide is becoming a mainstream battery material in the field of electronic products due to a high discharging voltage platform and large volume energy density.

SUMMARY

The discharge capacity of lithium cobalt oxide increases with the increase of working voltage. Generally speaking, for every 0.1V increase in the working voltage, the discharge capacity of lithium cobalt oxide can be increased by about 10%. Due to the pursuit of large energy density, the charging cut-off voltage operated by lithium cobalt oxide is constantly increased from 4.2V to 4.3V and to current 4.4V. However, when the lithium ion batteries are charged to 4.4V or more, more lithium ions are deintercalated from lithium cobalt oxide material so that the phase of lithium cobalt oxide material irreversibly transforms from O3 phase to H1-3 phase or O1 phase, and therefore the functions for reversible intercalation and deintercalation for lithium ions are lost. At the same time, the above processes are accompanied by dissolution of cobalt ions in electrolytes. That is, the lithium ion batteries may undergo irreversible phase change and structural collapse in a high-voltage charging and discharging environment so that a layered structure is destroyed. In addition, the lithium cobalt oxide cathode materials are in contact with the electrolytes for reaction, which would destroy the surfaces of particles and generate a gas production phenomenon, thereby negatively affecting the safety performance of the batteries and damaging the service life of the batteries.

In order to improve the cycle stability and safety performance of lithium cobalt oxide at high voltage, lithium cobalt oxide can be modified by doping or surface coating. In the prior art, a certain amount of doping elements are usually doped in the process of synthesizing lithium cobalt oxide to improve the structural stability of lithium cobalt oxide under high-voltage charging and discharging conditions. According to a conventional doping method, a cobalt source, a lithium source and dopants are mixed and then sintered at high temperature to obtain doped lithium cobalt oxide materials. However, the doping method above can only achieve enrichment of the doping elements on the surface layer of the cobalt source, but the doping elements are difficult to diffuse into a bulk phase of the cobalt source to achieve bulk doping. This is due to the fact that in the reaction process, a small amount of metal-doped lithium cobalt oxide phases are formed first, and then the remaining metal ions are diffused into the lithium cobalt oxide phases; however, in the diffusion process, the doping metal element ions compete with the lithium ions for diffusion into the bulk of the cobalt source; since $Li^+$ is a light metal ion and has a higher diffusion rate, once the lithium cobalt oxide phases are formed, the diffusion of the metal ions is blocked and the metal ions tend to concentrate on the surfaces of the particles. Therefore, there is a certain difficulty in achieving bulk doping for materials by using current methods in the prior art.

In order to solve the technical problems above, unlike the prior art, according to this application, the doping process is advanced to the stage of synthesis of the precursor of lithium cobalt oxide. In this application, $Co_3O_4$ is used as the precursor of lithium cobalt oxide, and the metal element M is doped in the process of synthesizing $Co_3O_4$ to obtain doped precursors $Co_{3-x}M_xO_4$. The lithium cobalt oxide cathode materials prepared from the precursor have excellent structural stability in the high-voltage charging and discharging environment, and thus the cycle performance, high temperature performance and safety performance of the lithium ion batteries are improved. At the same time, this application also provides methods of making the precursor. The methods are low in cost, simple in process, easy to control in reaction conditions and suitable for industrial production.

According to a first aspect of this application, this application provides a metal oxide having the general formula of $Co_{3-x}M_xO_4$, where $0<x\leq0.3$, M is one or more metal elements, and the difference value, measured by an energy spectrometer of a scanning electron microscopy, of the weight percentage of one of M in two identical area regions is E, where $0<E\leq1\%$ (wt. %).

In some embodiments, M includes at least one of Al, Mg, Ti, Zr, Ni, Mn, Y, Sc, V, Cr, Ga, Nb, Mo, In, Ce, Pr, Er, Yb, Lu, or W.

In some embodiments, the average valence of M in the metal oxide is A, where about $+2\leq A\leq$ about $+3.5$.

In some embodiments, the average valence of M in the metal oxide is A, where A is about $+3.0$.

In some embodiments, when M is only one metal element, M is only an element with the valence of $+2$ or $+3$.

In some embodiments, when M is a plurality of metal elements and the valence of each metal element is $+2$ or $+3$, the molar content ratio of the metal elements is an arbitrary value.

In some embodiments, when M is a plurality of metal elements, the valence of some metal elements is $+3$ and the valence of other metal elements is greater than $+3$, the molar content of the metal elements with the valence of $+3$ is about 50% or more of the total molar content of the doping metal elements.

In some embodiments, the metal oxide is of a single phase structure.

In some embodiments, the metal oxide is of a tetragonal spinel crystal structure.

In some embodiments, the metal oxide has no diffraction peak at a scattering angle smaller than the diffraction peak corresponding to a Miller index (111).

In some embodiments, the integrated intensity of the diffraction peak of a Miller index (311) of the metal oxide is greater than the integrated intensity of the diffraction peak of a Miller index (400).

In some embodiments, the metal oxide is used as a precursor for preparing lithium cobalt oxide which serves as the cathode material of the lithium ion batteries.

According to a second aspect of this application, this application provides a method for preparing the metal oxide. The method includes the following steps: mixing and reacting a solution of an M-containing compound, a solution of a Co-containing compound and an alkali solution to obtain a precipitation material; and sintering the precipitation material at about 500-1000° C. for about 4-12 h to obtain the metal oxide $Co_{3-x}M_xO_4$, where $0<x\leq0.3$, M is one or more metal elements, and the difference value, measured by the energy spectrometer of the scanning electron microscopy, of the weight percentage of one of M in two identical area regions is E, where $0<E\leq1\%$ (wt. %).

In some embodiments, the M-containing compound includes at least one of nitrate, oxalate, acetate, sulfate, fluoride or chloride of M.

In some embodiments, the molar concentration of M in the solution of the M-containing compound is about 0.01-5 mol/L.

In some embodiments, the feeding speed of the solution of the M-containing compound is about 0.1-0.8 m³/h.

In some embodiments, in the mixing and reacting step, the solution of the M-containing compound, the solution of the Co-containing compound and the alkali solution are mixed by means of a parallel feeding method.

In some embodiments, in the mixing and reacting step, the pH value of the mixed solution is about 6-9.

In some embodiments, in the mixing and reacting step, the reaction temperature is about 30-60° C., and the reaction time is about 4-200 h.

In some embodiments, the Co-containing compound includes at least one of cobalt chloride, cobalt acetate, cobalt sulfate, cobalt nitrate, cobalt carbonate, cobalt oxalate, cobalt citrate or cobalt phosphate.

In some embodiments, the alkali solution includes at least one of ammonia carbonate, ammonia bicarbonate, aqueous ammonia, sodium hydroxide, sodium carbonate or sodium bicarbonate.

According to a third aspect of this application, this application further utilizes the metal oxide $Co_{3-x}M_xO_4$ to prepare a lithium cobalt oxide composite having the general formula of $Li_aCo_{1-y}M_yN_bO_{2+c}$, where $0.99<a<1.05$, $0<y\leq0.1$, $0\leq b\leq0.1$, $0\leq c<0.2$, the metal element N is distributed on the surface layer of the lithium cobalt oxide composite, and M is one or more metal elements.

In some embodiments, the metal element N includes at least one of Al, Mg, Ti, Zr, Ni, Mn, Y, La or Sm.

In some embodiments, M includes at least one of Al, Mg, Ti, Zr, Ni, Mn, Y, Sc, V, Cr, Ga, Nb, Mo, In, Ce, Pr, Er, Yb, Lu or W.

According to a fourth aspect of this application, this application further provides a lithium ion battery including a cathode, an anode, a separator and an electrolyte, where the cathode includes the lithium cobalt oxide composite prepared from the metal oxide $Co_{3-x}M_xO_4$.

The additional aspects and advantages of the embodiments of this application are described or showed in the following description or set forth through implementation of the embodiments of this application.

BRIEF DESCRIPTION OF THE DRAWINGS

The drawings show some certain embodiments of this application and are used for further understanding the technical theme of this application together with the description above. However, the protection scope claimed herein is not limited to the drawings.

DETAILED DESCRIPTION

This application is described in detail as follows. It should be understood that the terms used in the description and appended claims should not be construed as limits to the general meanings and the meanings in a dictionary but explained according to meanings and concepts corresponding to the technical aspects of this application based on a principle that the inventor is allowed to define the terms appropriately for best explanation. Therefore, the descriptions shown in the embodiments and drawings of the description are merely specific examples for the purpose of explanation and are not intended to show all the technical aspects of this application, and it should be understood that a variety of optional equivalents and variants can be completed when this application is filed.

1. Performance Test of Lithium Ion Battery 1.1. Capacity Test

At 25° C., the lithium ion battery is charged to 4.45 V with a constant current of 0.5 C (1225 mA) and charged to 0.05 C (123 mA) with a constant voltage of 4.45 V and then discharged to 3.0 V with 0.5 C (1225 mA) to obtain the discharging capacity. The discharge capacity is further obtained through the following calculation formula: the discharge capacity=the discharge capacity/the mass of the cathode material.

1.2. Cycle Performance Test

At 25° C., the lithium ion battery is charged to 4.45 V with a constant current of 0.5 C (1225 mA) and charged to 0.05 C (123 mA) with a constant voltage of 4.45 V and then discharged to 3.0 V with 0.5 C (1225 mA). The charging and discharging cycle is repeated, and the cycle number of the lithium ion battery when the capacity retention ratio is decreased to 80% is recorded to represent the cycle performance of the obtained lithium cobalt oxide material.

1.3. High-Temperature Energy Storage Performance Test

At 25° C., the lithium ion battery is charged with a constant current of 0.5 C (1225 mA) till the voltage is higher than 4.45 V and further charged at constant voltage of 4.45 V till the current is lower than 0.05 C so that the lithium ion battery is in a fully charged state of 4.45 V. The thickness of the fully charged battery before storage is measured and recorded as $D_0$. Then, the battery in the fully charged state is stored in an oven at 85° C. for 6 hours, and the thickness of the stored lithium ion battery is measured while it is hot and recorded as $D_1$.

The thickness expansion ratio of the battery before and after storage is calculated according to the following formula:

$$\varepsilon = (D_1 - D_0)/D_0 \times 100\%.$$

1.4. Safety Performance Test

At 25° C., the lithium ion battery is charged with a constant current of 0.5 C (1225 mA) to 4.50 V and charged with constant voltage of 4.50 V to 0.05 C (123 mA). The lithium ion battery is disassembled in an argon-protected glove box, and a cathode piece is taken out and cleaned in a DMC solution. After DMC is completely volatilized, the cathode material is scraped off from the surface of the cathode piece. 10 mg of the cathode material is weighed and placed into a special aluminum crucible. 0.1 µL of the electrolytes (the electrolytes is the same as that in the preparation process of the lithium ion battery) is added, and after this, the aluminum crucible is sealed for a DSC test. The scanning temperature range of the DSC test is 50-500° C., the heating rate is 10° C./min, and the temperature corresponding to the main peak is test as the oxygen release temperature.

2. Specific Embodiments

2.1. Metal Oxide $Co_{3-x}M_xO_4$

According to a first aspect of this application, $Co_3O_4$ was selected as a precursor of lithium cobalt oxide, and one or more metal elements M were doped in the particles of $Co_3O_4$ to obtain the doped lithium cobalt oxide precursor $Co_{3-x}M_xO_4$, where the molar content of the doping element M was adjusted so that x was in a range of $0 < x \leq 0.3$. Obviously, the molar content of M was determined based on the molar content of Co.

2.1.1. Discussion on Distribution of Doping Element M in the Precursor $Co_{3-x}M_xO_4$ In order to obtain the lithium cobalt oxide cathode material with excellent cycle stability and safety performance under high-voltage charging and discharging conditions, the distribution of the doping element M in the precursor $Co_{3-x}M_xO_4$ was researched, where M was one or more metal elements. Research results showed that when one or more metal elements M were doped to the bulk phase of $Co_3O_4$ and the difference value E of the weight percentage of one of M in two identical area regions was in a range of $0 < E \leq 1\%$ (wt. %), the lithium cobalt oxide composite material prepared from the precursor $Co_{3-x}M_xO_4$ could show excellent electrochemical performance.

The present application is further described in detail below with reference to the embodiments, but the embodiments of the present application are not limited thereto.

Embodiment 1

Embodiment 1 describes a precursor oxide $Co_{2.97}Al_{0.03}O_4$ with the bulk doped Al element, and a lithium cobalt oxide composite material $LiCo_{0.99}Al_{0.01}O_{2.028}Ti_{0.01}Zr_{0.004}$ which was prepared by using the precursor oxide and further coated with elements Ti and Zr on the surface layer. The preparation method includes the following steps:

(1) simultaneously adding $CoCl_2$ solution, an $Al(NO_3)_3$ solution and an ammonium carbonate solution with the concentration of 1 mol/L, 0.5 mol/L and 1.1 mol/L respectively into a reaction still for mixing and a co-precipitation reaction to obtain a precipitation material;

(2) sintering the precipitated material at 800° C. for 8 h to form the precursor oxide $Co_{2.97}Al_{0.03}O_4$ with the bulk doped Al element;

(3) mixing the precursor oxide $CO_{2.97}Al_{0.03}O_4$ and $Li_2CO_3$ according to a certain molar ratio and sintering at 1000° C. for 10 h to obtain $LiCo_{0.99}Al_{0.01}O_2$;

(4) mixing $LiCo_{0.99}Al_{0.01}O_2$, $TiO_2$ and $ZrO_2$ according to a certain molar ratio and sintering at 800° C. for 10 h to form a high-voltage cathode material $LiCo_{0.99}Al_{0.01}O_{2.028}Ti_{0.01}Zr_{0.004}$ with both bulk phase doping and surface coating.

Embodiments 2 to 23 adopted substantially the same preparation method as Embodiment 1. The differences between these embodiments are that the solutions of different M elements were selected, and the feeding concentration and feeding speed were adjusted to obtain the precursor oxides $Co_{3-x}M_xO_4$ with different compositions and the high-voltage cathode materials $Li_aCo_{1-y}M_yN_bO_{2+c}$ with both bulk phase doping and surface coating. Comparative Example 1 also adopted substantially the same preparation method as Embodiment 1, except that pure $Co_3O_4$ was synthesized without being doped with any M element.

Figure 1:
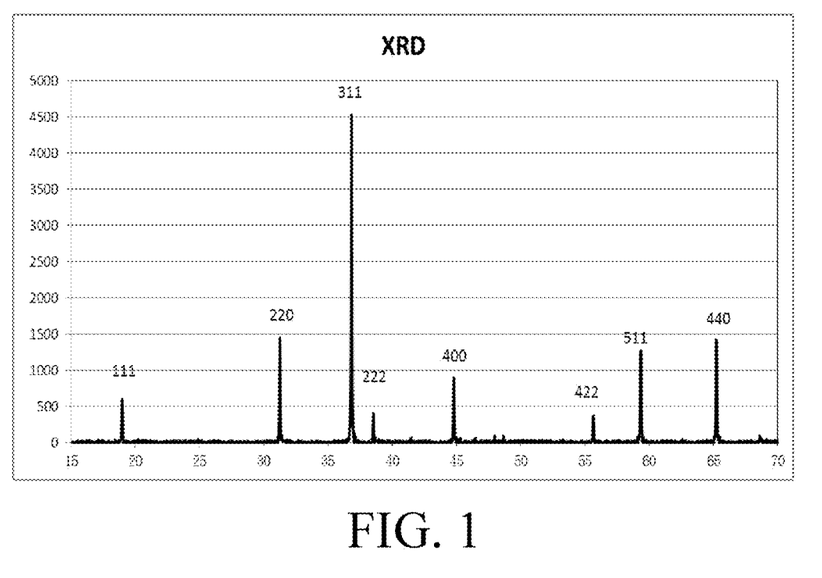
FIG. 1 is an X-ray diffraction (XRD) diagram of a metal oxide $Co_{2.97}Al_{0.03}O_4$ obtained in Embodiment 1 of this application.
Figure 2:
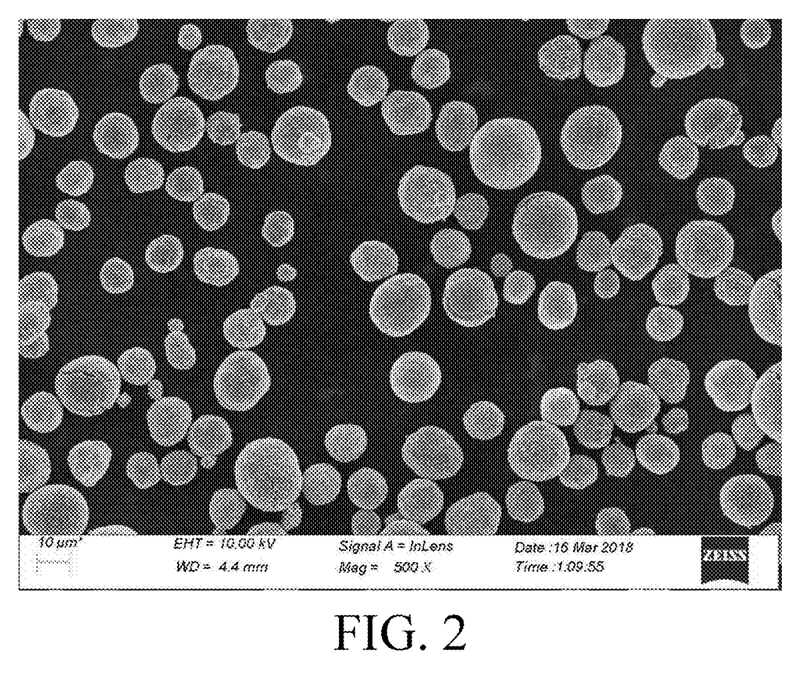
FIG. 2 is a scanning electron microscope (SEM) diagram of the metal oxide $Co_{2.97}Al_{0.03}O_4$ obtained in Embodiment 1 of this application.
Figure 3:
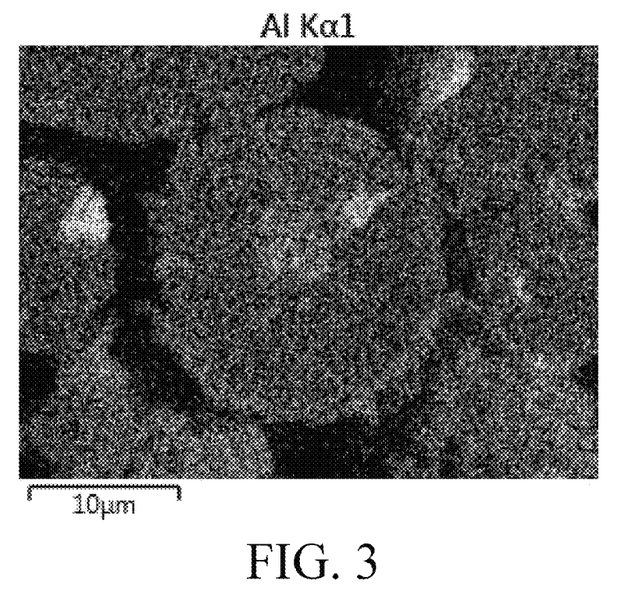
FIG. 3 is a bulk phase distribution diagram of the Al element of the metal oxide $Co_{2.97}Al_{0.03}O_4$ obtained in Embodiment 1 of this application.

Specifically, FIG. 1 to FIG. 3 show the oxide $Co_{2.97}Al_{0.03}O_4$ obtained in Embodiment 1 of the present application, where the Al element was doped into the bulk phase of $Co_3O_4$. It can be seen from the XRD diagram of FIG. 1 that the obtained $Co_{2.97}Al_{0.03}O_4$ is of a tetragonal spinel crystal structure. Further, it can also be seen from FIG. 1 that $Co_{2.97}Al_{0.03}O_4$ has no diffraction peak at the scattering angle smaller than the diffraction peak corresponding to the Miller index (111), and the integrated intensity of the diffraction peak of the Miller index (311) is greater than the integrated intensity of the diffraction peak of the Miller index (400). The XRD pattern indicates that $Co_{2.97}Al_{0.03}O_4$ is of a single phase structure, and the doping element Al enters the crystal lattice of $Co_3O_4$ instead of being mixed with $Co_3O_4$ in the form of an Al oxide.

FIG. 2 is an SEM photo of the obtained $Co_{2.97}Al_{0.03}O_4$, and FIG. 3 is a bulk phase distribution diagram of the Al element of the obtained $Co_{2.97}Al_{0.03}O_4$. It can be seen from FIG. 3 that the doping element Al is distributed in the bulk phase of $Co_{2.97}Al_{0.03}O_4$, and the difference value, measured by the spectrometer of the scanning electron microscope, of the weight percentage of the Al element in two identical area regions is 0.1%.

Calculation of the difference value of the weight percentage of the Al element in two identical area regions is explained below. The weight percentage of the doping elements was measured by the energy spectroscopy of the electron scanning electron microscope. The test process included the following steps: 1. obtaining the cross-sectional SEM view (see FIG. 4) of $Co_{2.97}Al_{0.03}O_4$; 2. selecting two identical area regions as research objects, wherein the two selected regions may be any two regions as long as the areas of the regions are the same, for example, a region A and a region B shown in FIG. 4; and 3. measuring the weight percentage and atomic percentage of each element in the region A and the region B by the energy spectrometer of the scanning electron microscope. Table 1 shows the weight percentages and atomic percentages, measured by the energy spectroscopy of the electron scanning electron microscope, of the O, Al, and Co elements in the region A and region B, and the results are as follows:

TABLE 1

Figure 4:
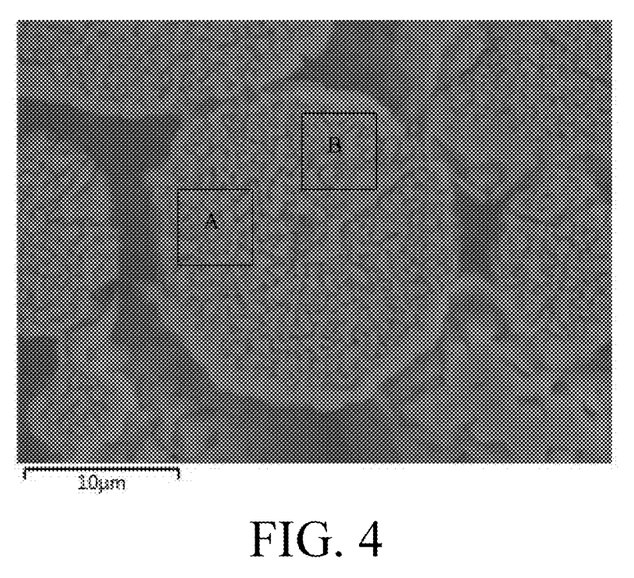
FIG. 4 is a cross-sectional SEM diagram of the metal oxide $CO_{2.97}Al_{0.03}O_4$ obtained in Embodiment 1 of this application.

Weight percentage and atomic percentage of elements in region A and region B in FIG. 4

| Types of elements | Weight percentage in region A wt. % | Atomic percentage in region A | Weight percentage in region B wt. % | Atomic percentage in region B |
|---|---|---|---|---|
| O | 17.73 | 44.18 | 17.66 | 43.95 |
| Al | 0.34 | 0.42 | 0.44 | 0.70 |
| Co | 81.93 | 55.40 | 81.90 | 55.35 |
| Total | 100.00 | 100.00 | 100.00 | 100.00 |

Furthermore, referring to Embodiments 2 to 4 of Table 2, according to this application, $Co_{2.97}Al_{0.03}O_4$ with E of about 0.3%, 0.6% and 1% was also synthesized separately. It is noted that the E value above was obtained based on two same area regions randomly selected from samples described in Embodiments 2 to 4, and the regions herein are not necessarily limited or not limited to region A and region B shown in FIG. 4. The doped precursor $Co_{2.97}Al_{0.03}O_4$ of Embodiments 1 to 4 was mixed with a lithium-containing material for sintering to prepare the lithium cobalt oxide cathode material, and the surface of the obtained lithium cobalt oxide cathode material was further coated with Ti and Zr elements to obtain the lithium cobalt oxide composite material $LiCo_{0.99}Al_{0.01}O_{2.028}Ti_{0.01}Zr_{0.004}$. Compared with a cathode material $Li_{1.01}CoO_{2.028}Ti_{0.01}Zr_{0.004}$ without any bulk phase doping (see Comparative Example 1), $LiCo_{0.99}Al_{0.01}O_{2.028}Ti_{0.01}Zr_{0.004}$ shown in Embodiments 1 to 4 was more stable in structure, and the lithium ion battery prepared by $LiCo_{0.99}Al_{0.01}O_{2.028}Ti_{0.01}Zr_{0.004}$ had better cycle performance, high temperature energy storage performance and safety performance.

Furthermore, according to this application, two or three metal elements were further doped in the particles of $Co_3O_4$. Research results showed that as long as the difference value E of the weight percentage of one of the doping metal elements in two identical area regions was in a range of about $0<E\leq1\%$ (wt. %), the precursor capable of preparing the high-pressure-resistant lithium cobalt oxide material could be obtained (see Embodiments 6 and 9).

In some embodiments, the difference value E of the weight percentage of each doping metal element in two identical area regions was in a range of about $0<E\leq1\%$ (wt. %), the lithium cobalt oxide cathode material which was prepared from the precursor $Co_{3-x}M_xO_4$ and further subjected to surface modification showed excellent structural stability, and the lithium ion batteries prepared from the lithium cobalt oxide cathode material had good cycle performance, high-temperature energy storage performance and safety performance (see Embodiments 5, 7 and 8).

Improvement of the electrochemical performance is mainly due to the fact that the bulk phase doping elements (for example, $Al^{3+}$) can be distributed in the precursor $Co_{2.97}Al_{0.03}O_4$ and the bulk phase of the subsequent lithium cobalt oxide cathode material $LiCo_{0.99}Al_{0.01}O_{2.028}Ti_{0.01}Zr_{0.004}$ by advancing the doping step to the stage of synthesizing the precursor so that the overall structure of the lithium cobalt oxide material is improved. On one hand, the doping cation can substitute the cobalt ions, and the doping cation can form stronger bond with the oxygen ions than the cobalt ions so that it is ensured that the layered structure of the lithium cobalt oxide material is not distorted due to a redox reaction in the charging and discharging process. On the other hand, the doping cation can be accommodated in gaps among the lithium ions, cobalt ions and oxygen ions. When the ionic radius of some cobalt ions is changed due to an oxidation reaction, the doping cation can improve lattice adaptation so that the stress generated by skeletal changes of the layered structure is relieved or released.

2.1.2. Discussion on Types of Doping Elements and Coating Elements

In addition to the Al element listed in Embodiments 1 to 4, based on the principles above, the doping metal elements also include, but are not limited to, one or more of Mg, Ti, Zr, Ni, Mn, Y, Sc, V, Cr, Ga, Nb, Mo, In, Ce, Pr, Er, Yb, Lu or W.

After the precursors $Co_{3-x}M_xO_4$ were used for the synthesis of bulk phase doped lithium cobalt oxide $LiCo_{1-y}M_yO_2$, if further surface coating of the lithium cobalt oxide particles $LiCo_{1-y}M_yO_2$ (for example, surface doping or modification to the surface layers of $LiCo_{1-y}M_y\ O_2$) was conducted, a better high-voltage-resistant lithium cobalt oxide material was obtained. First, the coating layer itself has excellent high-voltage structural stability and can form a stable cathode material/an electrolyte interface. Second, the coating layer can separate the lithium cobalt oxide material from the electrolyte, and a side reaction of the lithium cobalt oxide material and the electrolyte at high voltage is avoided so that the structure of lithium cobalt oxide is stabilized. Further, the coating layer itself has an energy storage function, and the structure is stabilized without sacrificing the capacity of the cathode material.

In some embodiments of the present application, in order to achieve the purposes above, the surface coating metal element includes, but is not limited to, at least one of Al, Mg, Ti, Zr, Ni, Mn, Y, La, or Sm.

For example, Embodiments 10 to 15 in Table 2 show embodiments of bulk phase doping of different elements on $Co_3O_4$ and surface coating of different elements on synthesized lithium cobalt oxide. Referring to the electrochemical data of Embodiments 5 to 10 in Table 2 and according to the teaching of this application, the lithium cobalt oxide composite obtained by simultaneously performing bulk phase doping and surface coating on lithium cobalt oxide showed excellent electrochemical performance. For example, the lithium ion batteries prepared from the cathode materials shown in Embodiments 10 to 15 had the capacity of 180 mAh/g or more at the discharge current of 0.5 C and all showed excellent cycle performance, high-temperature energy storage performance and safety performance. However, it should be understood that this application is not limited to the enumerated embodiments. A person skilled in the art can freely select different metal elements for bulk phase doping or surface coating according to the practical needs based on the teaching of this application, which can obtain the high-voltage lithium cobalt oxide cathode materials with stable structures.

2.1.3. Discussion on Average Valence of Doping Elements

This application used $Co_3O_4$ as the precursor of lithium cobalt oxide, and doping was performed thereon, where Co has two types of valence, namely +2 and +3, and the molar ratio of valence of +2 and +3 of Co is 1:2. In order to strengthen the layered structure of lithium cobalt oxide, it is necessary to substitute the Co atoms with the element M having a stronger binding force with the oxygen atoms to ensure that the skeleton of the layered structure is not distorted in the high-voltage charging and discharging process. In view of this, it is necessary to select doping ions with properties close to that of $Co^{2+}$ and $Co^{3+}$ as much as possible to substitute the Co ions, to reduce lattice distortion caused by substitution.

Table 2 shows the lithium cobalt oxide precursors $Co_{3-x}M_xO_4$ obtained in Embodiments 16 to 23 and lithium cobalt oxide composite cathode materials $Li_aCo_{1-y}M_yN_bO_{2+c}$ prepared from the precursors, where M and N are bulk phase doping elements and surface coating elements respectively. The "average valence of the elements doping in the precursor" listed in Table 2 was calculated according to the molar content of the doping elements and the valence of the doping elements. For example, in the precursor $Co_{2.95}Ag_{0.025}Mg_{0.025}O_4$ obtained in Embodiment 11, the doping elements $Ag^+$ and $Mg^{2+}$ accounted for 50% and 50% of the total doping molar content respectively, and the average valence A of the precursor doping elements was calculated as follows: $(+1) \times 50\% + (+2) \times 50\% = +1.5$.

Referring to the electrochemical data shown in Embodiments 16 to 23 of Table 2, compared with the average valence A, which is less than about +2 or greater than about +3.5, of the doping metal elements, when the average valence A of the doping metal elements is in a range of about $+2 \leq A \leq$ about +3.5, the electrochemical performance of the obtained lithium cobalt oxide materials is better. This is due to the fact that the closer the average valence of the doping metal elements is to the valence of $Co^{2+}$ and $Co^{3+}$, the smaller the distortion of the layered structure caused by a substitution reaction is, and the more stable the structures of the obtained materials are. In some embodiments, the average valence A of the doping metal elements is about +3.

In order to make the average valence A of the doping metal elements in the range of about $+2 \leq A \leq$ about +3.5, in some embodiments, when only one metal element was doped, the metal element was only the element with the valence of +2 or +3. In some embodiments, when a plurality of metal elements were doped and the valence of any one of the metal elements was +2 or +3, the ratio of the molar content of the metal elements could be any value. In some embodiments, when a plurality of metal elements were doped, the valence of some of the metal elements was greater than +3 and the valence of the other metal elements was equal to +3, the molar content of the elements having the valence of +3 was about 50% or more of the total molar content of the doping elements.

2.1.4. Discussion on Crystal Form of $Co_{3-x}M_xO_4$

As described above, modification on the electrochemical performance of lithium cobalt oxide by the doping elements is mainly based on the fact that the doping elements M substitute the cobalt sites or are accommodated in the gaps among lithium ions, cobalt ions and oxygen ions. Therefore, the crystal form of obtained $Co_{3-x}M_xO_4$ is expected to be a single phase, that is, the doping elements M enter the crystal lattice of $Co_3O_4$ rather than being mixed in $Co_3O_4$ in the form of an M oxide.

The above crystal structure is embodied in the XRD diagram as follows: the $Co_{3-x}M_xO_4$ oxide had no diffraction peak at the scattering angle smaller than the diffraction peak corresponding to the Miller index (111); further, the integrated intensity of the diffraction peak of the Miller index (311) was greater than the integrated intensity of the diffraction peak of the Miller index (400). That is, the $Co_{3-x}M_xO_4$ oxides having the above crystal structure showed further embodiments of this application.

2.2 Preparation Method of Metal Oxides $Co_{3-x}M_xO_4$

According to the second aspect of this application, this application further provides a method for preparing the oxide $Co_{3-x}M_xO_4$. The metal oxide $Co_{3-x}M_yO_4$ can be prepared by means of a liquid phase precipitation process and a sintering process. The liquid phase precipitation process is that the Co-containing compound and the M-containing compound are mixed in an aqueous solution, and the pH of the mixed solution, the feeding speed, the stirring speed, the reaction temperature and other technical parameters are adjusted so that different atoms are precipitated simultaneously in the synthesis process, and atom-level mixing is achieved. Specifically, the synthesis method includes the following steps:

a liquid phase precipitation step (the mixing and reacting step): the solution of the M-containing compound, the solution of the Co-containing compound and the alkali solution were mixed and reacted to obtain a precipitation material; and a sintering step: the precipitation material was sintered at about 500-1000° C. for about 4-12 h to obtain the metal oxide $Co_{3-x}M_xO_4$.

Based on the molar content of the Co-containing compound participating in the reaction, the molar content of the metal element M-containing compound participating in the reaction was adjusted to adjust the value of x so that x was in a range of about $0 < x \leq 0.3$. The reaction conditions were adjusted to adjust the bulk phase distribution state of M in the metal oxide so that the difference value E, measured by the energy spectrometer of the scanning electron microscope, of the weight percentage of at least one of the metal elements M in two identical area regions was in a range of about $0 < E \leq 1\%$ (wt. %).

In some embodiments, M includes one or more elements of Al, Mg, Ti, Zr, Ni, Mn, Y, Sc, V, Cr, Ga, Nb, Mo, In, Ce, Pr, Er, Yb, Lu, or W.

In some embodiments, the M-containing compound includes at least one of nitrate, oxalate, acetate, sulfate, fluoride or chloride of M.

In some embodiments, the Co-containing compound includes at least one of cobalt chloride, cobalt acetate, cobalt sulfate, cobalt nitrate, cobalt carbonate, cobalt oxalate, cobalt citrate or cobalt phosphate.

In some embodiments, the alkali solution includes at least one of ammonia carbonate, ammonia bicarbonate, aqueous ammonia, sodium hydroxide, sodium carbonate or sodium bicarbonate.

In some embodiments, the molar concentration of the M ions in the solution of the M-containing compound is about 0.01-5 mol/L; and the molar concentration of the Co ions in the solution of the Co-containing compound is about 1 mol/L.

In some embodiments, the feeding speed of the solution of the M-containing compound is about 0.1-0.8 m$^3$/h.

In some embodiments, in the mixing and reacting step, the solution of the M-containing compound, the solution of the Co-containing compound and the alkali solution are mixed by means of a parallel feeding method.

In some embodiments, in the mixing and reacting step, the pH of the reaction system is controlled to be about 6-9.

In some embodiments, in the mixing and reacting step, the reaction temperature is about 30-60° C., and the reaction time is about 4-200 h.

Through the preparation method described above, the doping elements and the cobalt ions were uniformly distributed in the liquid phase system by using the liquid phase precipitation method so that the doping elements were completely reacted. In the high-temperature sintering process, the precursors of loose structures shrank into the tightly fused precursors $Co_{3-x}M_xO_4$ with stable structures, where the doping element atoms more stable than the cobalt atoms occupied the cobalt sites, and the structural stability of the precursor $Co_3O_4$ was improved; at the same time, in the high-temperature sintering process, the doping element atoms were redistributed in the bulk phase of $Co_3O_4$, and some doping element atoms entered the gaps of the lattice structure so that the stress in high-voltage cycle was alleviated, and the crystal structure was stabilized.

2.3 Lithium Cobalt Oxide Compound $Li_aCo_{1-y}M_yN_bO_{2+d}$ Prepared from Metal Oxide $Co_{3-x}M_xO_4$ According to a third aspect of this application, this application further discloses a doped lithium cobalt oxide compound $Li_aCo_{1-y}M_yN_bO_{2+c}$ prepared from the precursor $Co_{3-x}M_xO_4$, where $0.99<a<1.05$, $0<y\leq0.1$, $0\leq b\leq0.1$, $0\leq c<0.2$. The preparation process is as follows:

(1) The doped precursor $Co_{3-x}M_xO_4$ was mixed with a lithium-containing material for calcination to obtain a doped lithium cobalt oxide cathode material $Li_aCo_{1-y}M_yO_2$.

(2) The doped lithium cobalt oxide cathode material $Li_aC_{1-y}M_yO_2$ was mixed with an N-containing oxide (here, N represents a metal element, but not a nitrogen element) in a certain ratio for calcination to obtain the high-voltage cathode material $Li_aCo_{1-y}M_yN_bO_{2+c}$ with both bulk phase doping and surface coating.

In some embodiments, the lithium-containing material includes, but is not limited to, one or more of lithium hydroxide, lithium carbonate or lithium oxide.

In some embodiments, the molar content of the lithium ions in the lithium-containing material can be about 0.95-1.2 mol or about 0.98-1.05 mol, relative to 1 mol of Co atoms in the precursor.

In some embodiments, the calcination temperature in step (1) is about 600-1300° C., and the calcination temperature in step (2) is about 600-1100° C.

2.4 Lithium Ion Battery

According to a fourth aspect of this application, this application further provides a lithium ion battery including a cathode, an anode, a separator disposed between the cathode and the anode, and electrolyte, where the cathode includes the lithium cobalt oxide compound $Li_aCo_{1-y}M_yN_bO_{2+c}$ prepared from the above-mentioned metal oxide $Co_{3-x}M_xO_4$. Specifically, the lithium ion battery is prepared by the following method:

Preparation of the cathode: after the active material lithium cobalt oxide composite $Li_aCo_{1-y}M_yN_bO_{2+c}$, a conductive agent Super-P, polyvinylidene fluoride (PVDF) serving as a binder were thoroughly and uniformly stirred and mixed in an N-methylpyrrolidone solvent system according to the weight ratio of about 97:1:2, Al foil was coated with the mixture, dried and cold-pressed to obtain the cathode.

Preparation of the anode: after anode material artificial graphite, sodium carboxymethyl cellulose (CMC) serving as a thickener, styrene butadiene rubber (SBR) serving as a binder were thoroughly and uniformly stirred and mixed in a deionized water solvent system according to the weight ratio of about 98:1:1, Cu foil was coated with the mixture, dried and cold-pressed to obtain the anode.

Polyethylene (PE) porous polymeric films were used as the separator.

The cathode, the separator and the anode were stacked in order so that the separator was located between the anode and cathode to achieve an isolation effect, and a battery cell was obtained by winding. The battery cell was placed in a package, and the prepared base electrolyte was injected and packaged.

The above are the embodiments listed in this application. However, since the applicant cannot exhaust all the embodiments, other equivalent embodiments made based on the teaching of this application all fall within the scope of this application.

Compared with the prior art, this application has at least the following advantages: the liquid phase precipitation method by ion/atomic level mixing and high temperature sintering treatment are adopted for synthesis of the bulk phase doped cobalt oxide precursors, and enrichment of the doping elements on the surface layer of the cathode materials is avoided. At the same time, the lithium cobalt oxide cathode materials prepared from the cobalt oxide precursors are used as the cathode active materials so that the structural stability of the materials in a high-voltage charging and discharging environment can be effectively improved, and the cycle performance, high temperature performance and safety performance of the lithium ion batteries are improved. In addition, the preparation methods involved in this application are simple, easy to operate and control and suitable for industrial production.

In summary, this application provides a method which is simple and easy to implement and suitable for industrial production of precursors of doped lithium cobalt oxide cathode materials, and the lithium cobalt oxide cathode materials prepared from the precursors are of stable particle structures so that the cycle performance, high temperature performance and safety performance of the lithium ion batteries can be effectively improved.

As used in the specification, the term "about" is used for describing and explaining minor variations. When used in combination with an event or circumstance, the term can refer to an example in which an event or circumstance occurs precisely and an example in which the event or circumstance occurs approximately. For example, when used in combination with a value, the term can refer to a variation range less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1% or less than or equal to ±0.05%. In addition, quantities, ratios and other values are sometimes presented in a range format in the specification. It should be understood that the range format is intended for convenience and brevity, should be understood flexibly and not only contains values explicitly specified as scope limits but also contains all individual values or sub-ranges within the range, as if each value and sub-range are explicitly specified.

The description above summarizes the features of several embodiments so that a person of ordinary skill in the art can understand the various aspects of this application. A person of ordinary skill in the art can easily use the application as a basis for designing or modifying other compositions to achieve the same objectives and/or the same advantages as the embodiments herein. A person of ordinary skill in the art can also understand that those equal embodiments do not depart from the spirit and scope of this application, and various changes, substitutions and modifications may be made without departing from the spirit and scope of this application. Although the method disclosed herein is described with reference to the specific operations which are performed in a specific sequence, it should be understood that those operations can be combined, subdivided or re-sequenced to form equivalent methods without departing from the instruction of this application. Therefore, unless otherwise specified, the sequence and grouping of the operations do not limit this application.

TABLE 2

Experimental results of embodiments and comparative examples

| Number | General formula of Co-containing oxides | Average valence of the elements doped in the precursor | Weight percentage difference value of doping elements (E %) | Lithium cobalt oxide (general formula) | capacity 4.45 V RT 0.5 C/0.5 C | Cycle performance 4.45 V RT Cycle @ 80% | Storage performance 4.45 V 100% SOC 85° C./6 h | Safety performance 4.45 V 100% SOC DSC |
|---|---|---|---|---|---|---|---|---|
| Embodiment 1 | $Co_{2.97}Al_{0.03}O_4$ | +3 | 0.1 | $LiCo_{0.99}Al_{0.01}O_{2.028}Ti_{0.01}Zr_{0.004}$ | 182.0 | 700 | 6% | 262 |
| Embodiment 2 | $Co_{2.97}Al_{0.03}O_4$ | +3 | 0.3 | $LiCo_{0.99}Al_{0.01}O_{2.028}Ti_{0.01}Zr_{0.004}$ | 180.0 | 650 | 6% | 258 |
| Embodiment 3 | $Co_{2.97}Al_{0.03}O_4$ | +3 | 0.6 | $LiCo_{0.99}Al_{0.01}O_{2.028}Ti_{0.01}Zr_{0.004}$ | 179.0 | 600 | 8% | 255 |
| Embodiment 4 | $Co_{2.97}Al_{0.03}O_4$ | +3 | 1 | $LiCo_{0.99}Al_{0.01}O_{2.028}Ti_{0.01}Zr_{0.004}$ | 177.0 | 580 | 9% | 250 |
| Embodiment 5 | $Co_{2.98}Mg_{0.01}Ti_{0.01}O_4$ | +3 | Ti: 0.1 Mg: 0.01 | $LiCo_{0.994}Mg_{0.003}Ti_{0.003}O_{2.023}Al_{0.01}Zr_{0.004}$ | 182.0 | 670 | 13% | 264 |
| Embodiment 6 | $Co_{2.98}Mg_{0.01}Ti_{0.01}O_4$ | +3 | Ti: 0.3 Mg: 1.5 | $LiCo_{0.994}Mg_{0.003}Ti_{0.003}O_{2.023}Al_{0.01}Zr_{0.004}$ | 181.0 | 640 | 16% | 260 |
| Embodiment 7 | $Co_{2.98}Mg_{0.01}Ti_{0.01}O_4$ | +3 | Ti: 0.3 Mg: 0.1 | $LiCo_{0.994}Mg_{0.003}Ti_{0.003}O_{2.023}Al_{0.01}Zr_{0.004}$ | 181.0 | 650 | 12% | 258 |
| Embodiment 8 | $Co_{2.97}Mg_{0.01}Ti_{0.01}Al_{0.01}O_4$ | +3 | Al: 0.1 Mg: 0.01 Ti: 0.1 | $LiCo_{0.99}Mg_{0.003}Ti_{0.003}Al_{0.003}O_{2.023}Al_{0.01}Zr_{0.004}$ | 181.5 | 750 | 8% | 266 |
| Embodiment 9 | $Co_{2.97}Mg_{0.01}Ti_{0.01}Al_{0.01}O_4$ | +3 | Al: 0.3 Mg: 1.5 Ti: 0.1 | $LiCo_{0.99}Mg_{0.003}Ti_{0.003}Al_{0.003}O_{2.023}Al_{0.01}Zr_{0.004}$ | 180.0 | 700 | 9% | 260 |

TABLE 2-continued

Experimental results of embodiments and comparative examples

| Number | General formula of Co-containing oxides | Average valence of the elements doped in the precursor | Weight percentage difference value of doping elements (E %) | Lithium cobalt oxide (general formula) | capacity 4.45 V RT 0.5 C/ 0.5 C | Cycle performance 4.45 V RT Cycle @ 80% | Storage performance 4.45 V 100% SOC 85° C./6 h | Safety performance 4.45 V 100% SOC DSC |
|---|---|---|---|---|---|---|---|---|
| Embodiment 10 | $Co_{2.95}Al_{0.025}Ti_{0.025}O_4$ | +3.5 | 0.5 | $Li_{1.005}Co_{0.984}Al_{0.0083}Ti_{0.0083}O_{2.018}Mg_{0.01}Zr_{0.004}$ | 181.0 | 500 | 8% | 250 |
| Embodiment 11 | $Co_{2.95}Al_{0.025}Zr_{0.025}O_4$ | +3.5 | 0.5 | $Li_{1.005}Co_{0.984}Al_{0.0083}Zr_{0.0083}O_{2.018}Mg_{0.01}Ti_{0.004}$ | 181.0 | 540 | 8% | 240 |
| Embodiment 12 | $Co_{2.95}Al_{0.025}Mn_{0.025}O_4$ | +3.5 | 0.5 | $Li_{1.005}Co_{0.984}Al_{0.0083}Mn_{0.0083}O_{2.018}Mg_{0.01}Ti_{0.004}$ | 182.0 | 500 | 8% | 250 |
| Embodiment 13 | $Co_{2.95}Al_{0.025}Mg_{0.025}O_4$ | +2.5 | 0.1 | $Li_{1.01}Co_{0.984}Al_{0.0083}Mg_{0.0083}O_{2.06}Ni_{0.02}Mn_{0.02}$ | 181.0 | 850 | 7% | 245 |
| Embodiment 14 | $Co_{2.95}Al_{0.025}Mg_{0.025}O_4$ | +2.5 | 0.1 | $Li_{1.01}Co_{0.984}Al_{0.0083}Mg_{0.0083}O_{2.08}La_{0.02}Y_{0.04}Zr_{0.02}$ | 181.0 | 900 | 6% | 248 |
| Embodiment 15 | $Co_{2.95}Al_{0.025}Mg_{0.025}O_4$ | +2.5 | 0.1 | $Li_{1.01}Co_{0.984}Al_{0.0083}Mg_{0.0083}O_{2.06}La_{0.02}Sm_{0.02}Mn_{0.02}$ | 182.0 | 700 | 8% | 235 |
| Embodiment 16 | $Co_{2.95}Ag_{0.025}Mg_{0.025}O_4$ | +1.5 | 0.2 | $Li_{1.01}Co_{0.984}Ag_{0.0083}Mg_{0.0083}O_{2.028}Ti_{0.01}Zr_{0.004}$ | 182.1 | 480 | 40% | 225 |
| Embodiment 17 | $Co_{2.95}Al_{0.025}Mg_{0.025}O_4$ | +2.5 | 0.2 | $Li_{1.01}Co_{0.984}Al_{0.0083}Mg_{0.0083}O_{2.028}Ti_{0.01}Zr_{0.004}$ | 182.0 | 650 | 30% | 235 |
| Embodiment 18 | $Co_{2.7}Al_{0.21}Mg_{0.09}O_4$ | +2.7 | 0.2 | $Li_{1.02}Co_{0.90}Al_{0.07}Mg_{0.03}O_{2.028}Ti_{0.01}Zr_{0.004}$ | 181.5 | 700 | 8% | 253 |
| Embodiment 19 | $Co_{2.97}Al_{0.03}O_4$ | +3 | 0.2 | $LiCo_{0.99}Al_{0.01}O_{2.028}Ti_{0.01}Zr_{0.004}$ | 181.0 | 650 | 6% | 260 |
| Embodiment 20 | $Co_{2.95}Al_{0.025}Y_{0.025}O_4$ | +3 | 0.2 | $LiCo_{0.984}Al_{0.0083}Y_{0.0083}O_{2.028}Ti_{0.01}Zr_{0.004}$ | 182.0 | 600 | 11% | 242 |
| Embodiment 21 | $Co_{2.95}Al_{0.025}Ni_{0.025}O_4$ | +2.5 | 0.2 | $Li_{1.01}Co_{0.984}Al_{0.0083}Ni_{0.0083}O_{2.028}Ti_{0.01}Zr_{0.004}$ | 181.5 | 650 | 15% | 235 |
| Embodiment 22 | $Co_{2.95}Al_{0.02}Ti_{0.03}O_4$ | +3.6 | 0.2 | $Li_{1.01}Co_{0.984}Al_{0.0083}Mg_{0.0083}O_{2.028}Ti_{0.01}Zr_{0.004}$ | 181.0 | 470 | 20% | 255 |
| Embodiment 23 | $Co_{2.97}Ti_{0.03}O_4$ | +4 | 0.2 | $Li_{0.99}Co_{0.99}Ti_{0.01}O_{2.028}Ti_{0.01}Zr_{0.004}$ | 182.0 | 450 | 15% | 253 |
| Comparative example 1 | $Co_3O_4$ | 0 | 0 | $Li_{1.01}CoO_{2.028}Ti_{0.01}Zr_{0.004}$ | 183.5 | 280 | 120% | 210 |

What is claimed is:

1. A metal oxide, having the general formula of $Co_{3-x}M_xO_4$, wherein $0<x\leq0.3$, M is one or more metal elements, and a difference value, measured by an energy spectrometer of a scanning electron microscopy, of the weight percentage of one of M in two identical area regions is E, wherein $0<E\leq1\%$ (wt. %), wherein M comprises at least one of Al, Mg, Ti, Zr, Ni, Mn, Y, Sc, V, Cr, Ga, Nb, Mo, In, Ce, Pr, Er, Yb, Lu, or W.

2. The metal oxide according to claim 1, wherein an average valence of M in the metal oxide is A, and $+2\leq A\leq+3.5$.

3. The metal oxide according to claim 1, wherein the average valence of M in the metal oxide is A, and A is +3.0.

4. The metal oxide according to claim 1, wherein when M is only one metal element, M is only an element with the valence of +2 or +3.

5. The metal oxide according to claim 1, wherein when M is a plurality of metal elements and the valence of each metal element is +2 or +3, the molar content ratio of the metal elements is an arbitrary value.

6. The metal oxide according to claim 1, wherein when M is a plurality of metal elements, the valence of some metal elements is +3 and the valence of the other metal elements is greater than +3, the molar content of the metal elements with the valence of +3 is 50% or more of the total molar content of doping metal elements.

7. The metal oxide according to claim 1, wherein the metal oxide is of a single phase structure.

8. The metal oxide according to claim 1, wherein the metal oxide is of a tetragonal spinel crystal structure.

9. The metal oxide according to claim 1, wherein the metal oxide has no diffraction peak at a scattering angle smaller than the diffraction peak corresponding to a Miller index (111).

10. The metal oxide according to claim 1, wherein the integrated intensity of the diffraction peak of a Miller index (311) of the metal oxide is greater than the integrated intensity of the diffraction peak of a Miller index (400).

11. The metal oxide according to claim 1, wherein the metal oxide is used as a precursor for preparing lithium cobalt oxide as a cathode material of a lithium ion battery.

12. A lithium cobalt oxide composite prepared from the metal oxide according to claim 1, wherein the general formula is $Li_aCo_{1-y}M_yN_bO_{2+c}$, $0.99<a<1.05$, $0<y\leq0.1$, $0\leq b\leq0.1$, $0\leq c<0.2$, N is metal element, and N is distributed on the surface layer of the lithium cobalt oxide composite, and M is one or more metal elements.

13. The lithium cobalt oxide composite according to claim 12, wherein N comprises at least one of Al, Mg, Ti, Zr, Ni, Mn, Y, La or Sm.

14. The lithium cobalt oxide compound according to claim 12, wherein M comprises at least one of Al, Mg, Ti, Zr, Ni, Mn, Y, Sc, V, Cr, Ga, Nb, Mo, In, Ce, Pr, Er, Yb, Lu or W.

15. A lithium ion battery, comprising a cathode, an anode, a separator and an electrolyte, wherein the cathode comprises the lithium cobalt oxide composite prepared from the metal oxide according to claim 1.

16. A method for preparing a metal oxide, wherein the method comprises the following steps:

mixing and reacting a solution of an M-containing compound, a solution of a Co-containing compound and an alkali solution to obtain a precipitation material; and sintering the precipitation material at 500-1000° C. for 4-12 h to obtain the metal oxide, the general formula of the metal oxide being $Co_{3-x}M_xO_4$, wherein $0<x\leq0.3$, M is one or more metal elements, and the difference value, measured by the energy spectrometer of the scanning electron microscopy, of the weight percentage of one of M in two identical area regions is E, wherein $0<E\leq1\%$ (wt. %).

17. The method according to claim 16, wherein the M-containing compound comprises at least one of nitrate, oxalate, acetate, sulfate, fluoride or chloride of M.

18. The method according to claim 16, wherein the molar concentration of M in the solution of the M-containing compound is 0.01-5 mol/L.

19. The method according to claim 16, wherein in the mixing and reacting step, the pH value of the mixed solution is 6-9.

* * * * *